(12) United States Patent
Stracquadaini et al.

(10) Patent No.: US 11,955,897 B2
(45) Date of Patent: Apr. 9, 2024

(54) RESONANT DC-DC CONVERTER WITH AVERAGE HALF CYCLE CONTROL

(71) Applicant: Texas Instruments Incorporated, Dallas, TX (US)

(72) Inventors: Rosario Stracquadaini, San Gregorio di Catania (IT); Salvatore Giombanco, Cassaro (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 195 days.

(21) Appl. No.: 17/563,200

(22) Filed: Dec. 28, 2021

(65) Prior Publication Data
US 2022/0247320 A1 Aug. 4, 2022

Related U.S. Application Data

(60) Provisional application No. 63/145,803, filed on Feb. 4, 2021.

(51) Int. Cl.
*H02M 3/335* (2006.01)
*H02M 1/00* (2006.01)

(52) U.S. Cl.
CPC ..... *H02M 3/33569* (2013.01); *H02M 1/0009* (2021.05); *H02M 1/0058* (2021.05)

(58) Field of Classification Search
None
See application file for complete search history.

(56) References Cited

U.S. PATENT DOCUMENTS

| | | | | |
|---|---|---|---|---|
| 4,268,785 A * | 5/1981 | Svendsen | ........... | G11B 5/59627 318/620 |
| 4,696,425 A * | 9/1987 | Landes | ................... | B23K 20/10 310/317 |
| 4,866,592 A * | 9/1989 | Fujii | ................. | H02M 7/53871 363/36 |
| 5,053,937 A * | 10/1991 | Blockl | ................ | H02M 3/3376 363/16 |
| 6,795,006 B1* | 9/2004 | Delight | ................. | H03M 3/364 341/172 |
| 9,991,801 B2 | 6/2018 | Wang et al. | | |
| 11,196,351 B2* | 12/2021 | Li | ......................... | H02M 3/158 |
| 11,581,804 B1* | 2/2023 | Langeslag | ......... | H02M 3/33569 |

(Continued)

FOREIGN PATENT DOCUMENTS

EP 4123892 A1 * 1/2023 .......... H02M 1/0019

*Primary Examiner* — Thienvu V Tran
*Assistant Examiner* — Nusrat Quddus
(74) *Attorney, Agent, or Firm* — Charles F. Koch; Frank D. Cimino

(57) ABSTRACT

Resonant DC-DC converter control circuitry includes a feedback input, a differential integrator, a resonant voltage input, a first comparator, and a second comparator. The differential integrator includes a first input, a second input, a first output, and a second output. The first input is coupled to the feedback input. The second input is coupled to a ground terminal. The first comparator includes a first input coupled to the resonant voltage input, and a second input coupled to the first output of the differential integrator. The second comparator includes a first input coupled to the resonant voltage input, and a second input coupled to the second output of the differential integrator.

18 Claims, 13 Drawing Sheets

(56) References Cited

U.S. PATENT DOCUMENTS

| | | | | |
|---|---|---|---|---|
| 2005/0207193 A1* | 9/2005 | Adragna | ............... | H02M 1/12 |
| | | | | 363/89 |
| 2007/0109816 A1* | 5/2007 | Yang | ............... | H02M 3/33523 |
| | | | | 363/16 |
| 2011/0149607 A1* | 6/2011 | Jungreis | ............ | H02M 3/3376 |
| | | | | 363/21.02 |
| 2011/0157920 A1* | 6/2011 | Adragna | ............ | H02M 3/3376 |
| | | | | 363/21.03 |
| 2013/0002212 A1* | 1/2013 | Fan | ................... | H02M 3/156 |
| | | | | 323/235 |
| 2018/0048236 A1* | 2/2018 | Wang | ............... | H02M 3/33507 |
| 2018/0062383 A1* | 3/2018 | Kawashima | ........ | H02H 7/1213 |
| 2020/0195149 A1* | 6/2020 | Mayell | ............... | H02M 3/1584 |
| 2020/0228010 A1* | 7/2020 | Wiktor | ............... | H02M 3/158 |
| 2021/0067046 A1* | 3/2021 | Adragna | ............... | H02M 1/08 |
| 2021/0194378 A1* | 6/2021 | Tian | ............... | H02M 3/33592 |
| 2021/0223811 A1* | 7/2021 | Rodriguez | ......... | H02M 3/1584 |
| 2022/0045603 A1* | 2/2022 | Giombanco | ...... | H02M 3/33571 |
| 2022/0131550 A1* | 4/2022 | Sarraj | ............... | H03M 1/1245 |
| 2022/0200451 A1* | 6/2022 | Mai | ..................... | H02M 3/158 |
| 2022/0200457 A1* | 6/2022 | Mai | ..................... | H02M 3/158 |
| 2022/0352824 A1* | 11/2022 | Chiu | ............... | H02M 3/33507 |
| 2023/0031749 A1* | 2/2023 | Chakraborty | ......... | H03K 3/037 |
| 2023/0170808 A1* | 6/2023 | Vidal | ............... | H02M 1/0058 |
| | | | | 323/282 |
| 2023/0236309 A1* | 7/2023 | Park | ................... | G01S 13/88 |
| | | | | 342/22 |

* cited by examiner

US 11,955,897 B2

RESONANT DC-DC CONVERTER WITH AVERAGE HALF CYCLE CONTROL

CROSS-REFERENCE TO RELATED APPLICATIONS

This application claims priority to U.S. Provisional Application No. 63/145,803 filed Feb. 4, 2021, entitled "Average Half Cycle Control for LLC Resonant Converter," which is hereby incorporated by reference in its entirety.

BACKGROUND

LLC converters are a form of resonant DC-DC converters. Resonant DC-DC converters provide smooth waveforms, high efficiency, and high power density. Resonant DC-DC converters are switching DC-DC converters that include a tank circuit actively participating in determining input-to-output power flow. There are many types of resonant DC-DC converters and most, if not all, resonant converters are based on a resonant inverter such as a system that converts a DC voltage into a sinusoidal voltage and provides power to a load. The sinusoidal voltage is typically a low harmonic content AC voltage. Generation of the sinusoidal voltage is achieved by a switch network that produces a square-wave voltage that is applied to a resonant tank circuit tuned to the fundamental component of the square wave. In this way, the tank responds primarily to the fundamental component and negligibly to the higher order harmonics, so that its voltage and/or current, are essentially sinusoidal. LLC converters are used in many applications for their ability to achieve high efficiency with soft switching.

SUMMARY

In one example, resonant DC-DC converter control circuitry includes a feedback input, a differential integrator, a resonant voltage input, a first comparator, and a second comparator. The differential integrator includes a first input, a second input, a first output, and a second output. The first input is coupled to the feedback input. The second input is coupled to a ground terminal. The first comparator includes a first input coupled to the resonant voltage input, and a second input coupled to the first output of the differential integrator. The second comparator includes a first input coupled to the resonant voltage input, and a second input coupled to the second output of the differential integrator.

In another example, resonant DC-DC converter control circuitry includes a differential integrator, a first comparator, a second comparator, a first flip-flop, and a second flip-flop. The differential integrator is configured to generate a first threshold ramp based on a feedback signal received from an output of a resonant DC-DC converter, and to generate a second threshold ramp based on the feedback signal. The first comparator is coupled to the differential integrator, and is configured to compare the first threshold ramp to a resonant voltage generated in the resonant DC-DC converter. The second comparator is coupled to the differential integrator, and is configured to compare the second threshold ramp to the resonant voltage. The first flip-flop is coupled to the first comparator, and is configured to generate a first power transistor control signal based on an output signal of the first comparator. The second flip-flop is coupled to the second comparator, and is configured to generate a second power transistor control signal based on an output signal of the second comparator.

In a further example, resonant DC-DC converter control circuitry includes a first flip-flop, a second flip-flop, a time-to-voltage converter, a multiplier, and a differential amplifier. The first flip-flop is configured to generate a first power transistor control signal. The second flip-flop is configured to generate a second power transistor control signal. The time-to-voltage converter is coupled to the first flip-flop and the second flip-flop, and is configured to generate a time voltage proportional to a half cycle of the first power transistor control signal or the second power transistor control signal. The multiplier is coupled to the time-to-voltage converter, and is configured to multiply the time voltage with a feedback signal received from an output of a resonant DC-DC converter. The differential amplifier is coupled to the multiplier, and is configured to generate a first threshold voltage and a second threshold voltage based on an output signal of the multiplier.

BRIEF DESCRIPTION OF THE DRAWINGS

For a detailed description of various examples, reference will now be made to the accompanying drawings in which.

DETAILED DESCRIPTION

A number of control methods have been applied to LLC switching converters. One class of control methods, called charge cycle control, are based on control of resonant current, and provide desirable transfer function characteristics with a single pole up to sufficiently high frequencies that control loop compensation is simplified and loop bandwidth need not be reduced to provide good phase margin. While charge cycle control provides a single pole transfer function, the calculations are complex, and the single pole characteristic may be obtained with proper ramp compensation.

Controls circuits for switching converters have a control parameter ($V_{FB}$), provided via a feedback loop, that is preferably proportional to output power or output current when the switching converter is operating in a steady state condition. The relationship between $V_{FB}$ and the switching converter's output current or output power should be insensitive to changes in converter input voltage or changes in transformer parameters. Transformer parameters vary over a wide range, and cannot be directly measured, so the control circuit cannot compensate for the variation.

In most of the charge cycle control methods, the control loop controls the value of the integral of the resonant current over one-half of the switching cycle and $V_{FB}$ is strongly related to the switching period. Because of this $V_{FB}$ has a non-proportional relationship with output current or power even if it is monotonic. Unfortunately, in LLC resonant converters, the switching period changes with input voltage and resonant tank parameters, such as resonant inductance and transformer magnetizing inductance. Charge cycle control methods exhibit substantial sensitivity to input voltage and transformer parameter variations.

In the LLC resonant converters described herein, the relationship of $V_{FB}$ to output current or power is much more linear than in converters using charge cycle control, and sensitivity to input voltage and transformer parameter variations is significantly reduced (e.g., by a factor of 10) relative to converters using charge cycle control. In these LLC resonant converters, the integral of the resonant current is compared with a signal proportional to converter $V_{FB}$ multiplied the half switching period. As a result, the switching period term (which is not constant) is eliminated from the control calculations which reduces the sensitivity to input voltage and resonant tank parameter variation. Feedforward compensation may be applied to further reduce the sensitivity to input voltage variation.

Figure 1:
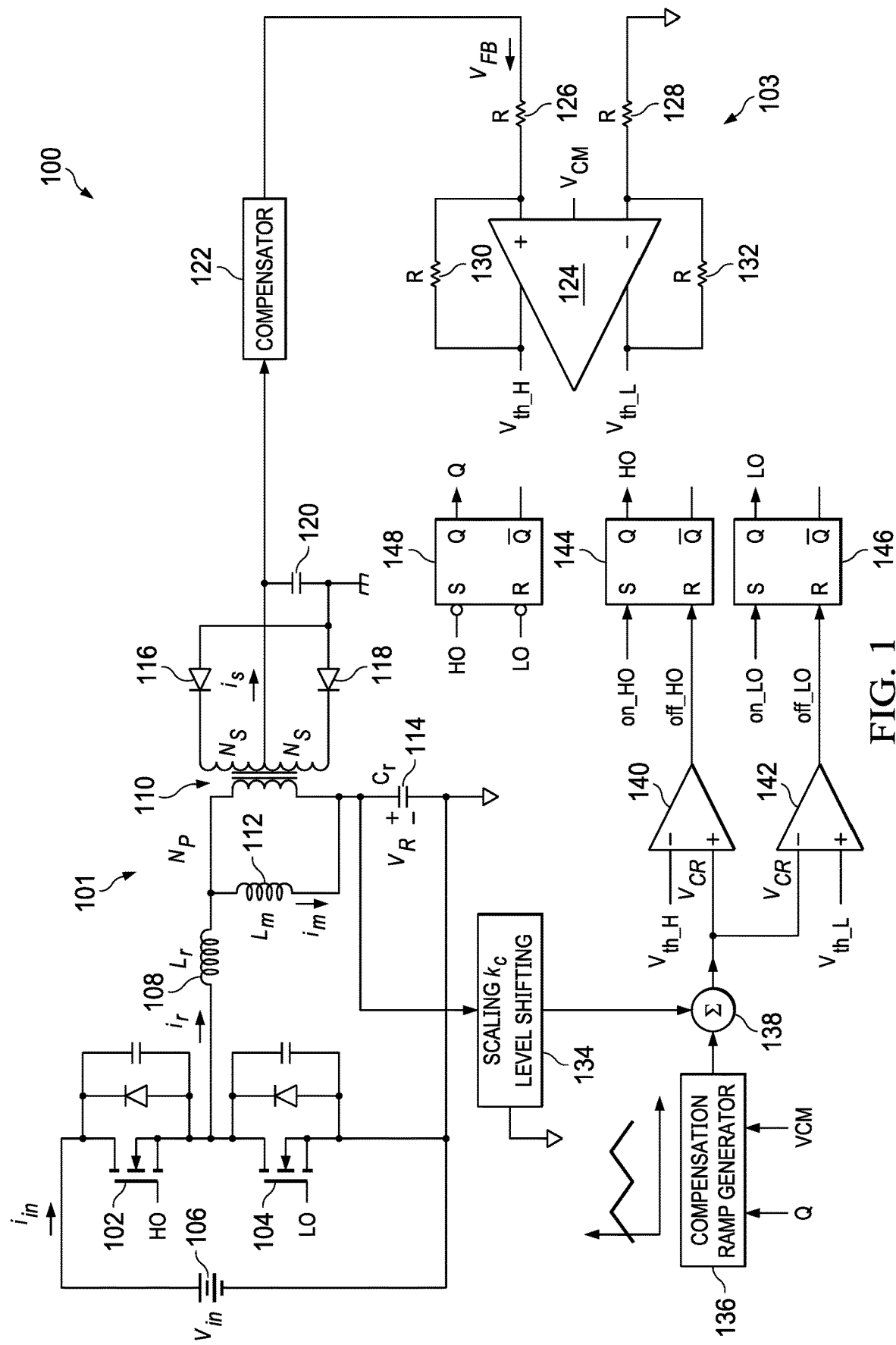
FIG. 1 is a block diagram for an example LLC resonant converter that implements a version of charge cycle control termed hybrid hysteretic control.

FIG. 1 is a block diagram for an example LLC resonant converter 100 that implements a version of charge cycle control termed hybrid hysteretic control (HHC). The LLC resonant converter 100 includes switching circuitry 101 and control circuitry 103. The switching circuitry 101 includes a high-side switching transistor 102, a low-side switching transistor 104, a voltage source 106, a series resonant inductor 108, a transformer 110, a resonant capacitor 114, rectifiers 116 and 118, and an output capacitor 120. The voltage source 106 is coupled to the high-side switching transistor 102 and the low-side switching transistor 104 to provide the input voltage ($V_{in}$) to the LLC resonant converter 100. The high-side switching transistor 102 and the low-side switching transistor 104 are coupled to the control circuitry 103 for receipt of control signals HO and LO that turn on and off the high-side switching transistor 102 and the low-side switching transistor 104. The high-side switching transistor 102 and the low-side switching transistor 104 are coupled to the primary coil of the transformer 110 via the series resonant inductor 108. The magnetizing inductance of the transformer 110 is illustrated as inductance 112. The resonant capacitor 114 is coupled between the primary coil of the transformer 110 and the voltage source 106.

The secondary coil of the transformer 110 is coupled to the rectifiers 116 and 118. A center tap of the secondary coil is coupled to the output capacitor 120 and to the control circuitry 103. The output capacitor 120 is also coupled to the rectifiers 116 and 118. The voltage across the output capacitor 120 is the output voltage of the LLC resonant converter 100.

The control circuitry 103 includes a compensator circuit 122, a differential amplifier 124, a scaling and level shifting circuit 134, a compensation ramp generator 136, a summing circuit 138, a comparator 140, a comparator 142, a flip-flop 144, a flip-flop 146, and a flip-flop 148. The input of the compensator circuit 122 is coupled to the output capacitor 120. The output of the compensator circuit 122 is coupled to a non-inverting input of the differential amplifier 124 via a resistor 126 for receipt of a control voltage $V_{FB}$ generated by the compensator circuit 122. A first output of the differential amplifier 124 is coupled to the non-inverting input of the differential amplifier 124 via the feedback resistor 130. An inverting input of the differential amplifier 124 is coupled to ground via a resistor 128. A second output of the differential amplifier 124 is coupled to the inverting input of the differential amplifier 124 via the feedback resistor 132. A high threshold voltage $V_{th\_H}$ is provided at the first output of the differential amplifier 124, and a low threshold voltage $V_{th\_L}$ is provided at the second output of the differential amplifier 124. The difference between $V_{th\_H}$ and $V_{th\_L}$ is equal or proportional to $V_{FB}$. $V_{th\_H}$ and $V_{th\_L}$ are equally spaced by the common mode voltage $V_{CM}$.

$$V_{th\_H} = V_{CM} + \frac{V_{FB}}{2} \quad (1)$$

$$V_{th\_L} = V_{CM} - \frac{V_{FB}}{2} \quad (2)$$

$$V_{th\_H} - V_{th_L} = V_{FB} \quad (3)$$

The resonant voltage $V_R$ across the resonant capacitor 114 is the integral of the resonant current $I_r$ flowing from the high-side switching transistor 102 and the low-side switching transistor 104 through the series resonant inductor 108.

$$\int_0^{\frac{T_{SW}}{2}} i_r(t) \cdot dt = C_r \cdot \left[ V_R\left(\frac{T_{SW}}{2}\right) - V_R(0) \right] = C_r \cdot \Delta V_R \quad (4)$$

where:
$C_r$ is the capacitance of the resonant capacitor 114; and
$T_{SW}$ is the switching period of the high-side switching transistor 102 and the low-side switching transistor 104.

Dividing equation (4) by $$\frac{T_{SW}}{2}$$

produces the average value of the resonant current.

$$I_{r\_avg} = C_r \cdot \frac{2}{T_{SW}} \cdot \Delta V_R \quad (5)$$

The scaling and level shifting circuit 134 is coupled to the resonant capacitor 114. The scaling and level shifting circuit 134 scales down $V_R$ by a factor $k_c$. The compensation ramp generator 136 generates a compensation ramp ($V_{RAMP}$) about $V_{CM}$. The compensation ramp has a positive slope from the falling edge of the low-side switching transistor control signal (LO) to the falling edge of the high-side switching transistor control signal (HO), and a negative slope elsewhere. The compensation ramp maintains the on time of the high-side switching transistor 102 and the low-side switching transistor 104 as equal as possible (i.e., maintains a 50% duty cycle in the half bridge formed by the high-side switching transistor 102 and the low-side switching transistor 104). The flip-flop 148 generates the signal Q based on HO and LO to trigger changes in the slope of the compensation ramp.

The compensation ramp is added to the scaled down $V_R$ in the summing circuit 138 to produce signal $V_{CR}$.

$$V_{CR} = k_c \cdot V_R + V_{RAMP} \tag{6}$$

The summing circuit 138 is coupled to the comparator 140 and the comparator 142. The comparator 140 compares $V_{CR}$ to $V_{th\_H}$ to generate a signal off_HO, and the comparator 142 compares $V_{CR}$ to $V_{th\_L}$ to generate a signal off_LO. The comparator 140 is coupled to the flip-flop 144, and the comparator 142 is coupled to the flip-flop 146. When $V_{CR}$ exceeds $V_{th\_H}$, the flip-flop 144 is reset by off_HO to turn off the high-side switching transistor 102. When $V_{CR}$ is less than $V_{th\_L}$, the flip-flop 146 is reset by off_LO to turn off the low-side switching transistor 104. The flip-flop 144 is set by the signal on_HO a predetermined time after the flip-flop 146 is reset (a predetermined time after LO goes low), and the flip-flop 146 is set by the signal on_LO a predetermined time after flip-flop 144 is reset (a predetermined time after the HO goes low). The flip-flop 144 is coupled to the high-side switching transistor 102 and the flip-flop 148. The flip-flop 146 is coupled to the low-side switching transistor 104 and the flip-flop 148.

Figure 2:
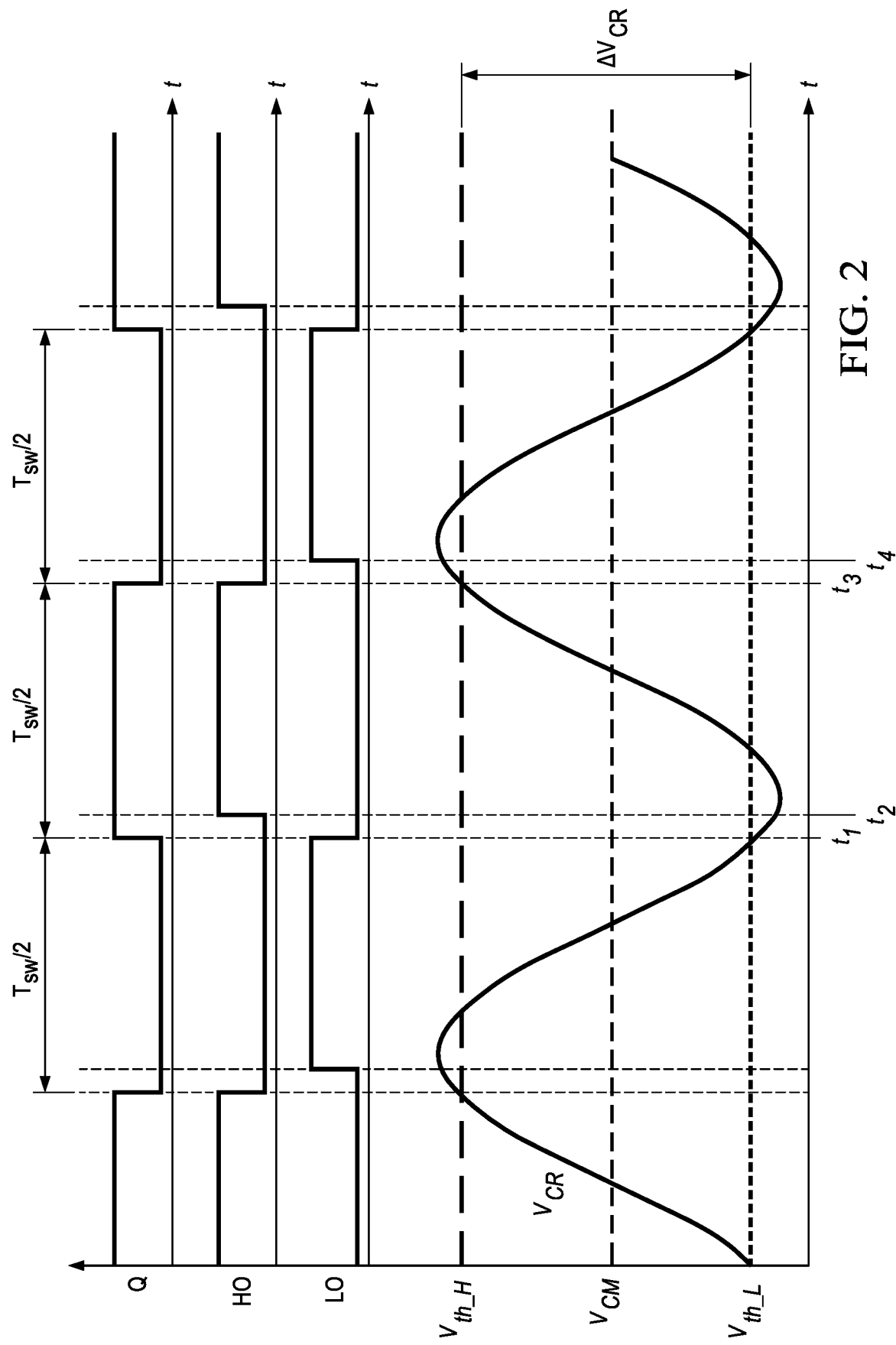
FIG. 2 shows example signals in the LLC resonant converter of FIG. 1.

FIG. 2 shows example signals in the LLC resonant converter 100. In FIG. 2, the signals HO, LO, Q, $V_{CR}$, $V_{th\_L}$, and $V_{th\_H}$ are shown. FIG. 2 shows that the variation of $V_{CR}$ ($\Delta V_{CR}$) over one-half of the switching cycle $$\left(\frac{T_{SW}}{2}\right)$$

is equal to the difference between $V_{th\_H}$ and $V_{th\_L}$.

$$\Delta V_{CR} = V_{th\_H} - V_{th\_L} = V_{FB} \tag{7}$$

The variation of $V_{CR}$ ($\Delta V_{CR}$) over one-half of the switching cycle $$\left(\frac{T_{SW}}{2}\right)$$

is related to the variation of the resonant voltage ($V_R$) as:

$$\Delta V_{CR} = k_c \cdot \Delta V_R + \Delta V_{RAMP} \tag{8}$$

In a steady state condition, $V_{RAMP}$ is symmetrical and $\Delta V_{RAMP}$ is constant. $\Delta V_{RAMP}$ is the difference between the peak value and the minimum value of the ramp. Absolute values of negative and positive slope are equal. With $S_{RAMP}$ being the absolute value of the $\Delta V_{RAMP}$ slope, and taking into account equations (3), (5) and (6), the following equation is obtained:

$$V_{FB} = \frac{T_{SW}}{2} \cdot \frac{k_c}{C_r} \cdot I_{r_{avg}} + \frac{T_{SW} \cdot S_{RAMP}}{2} \tag{9}$$

Figure 3:
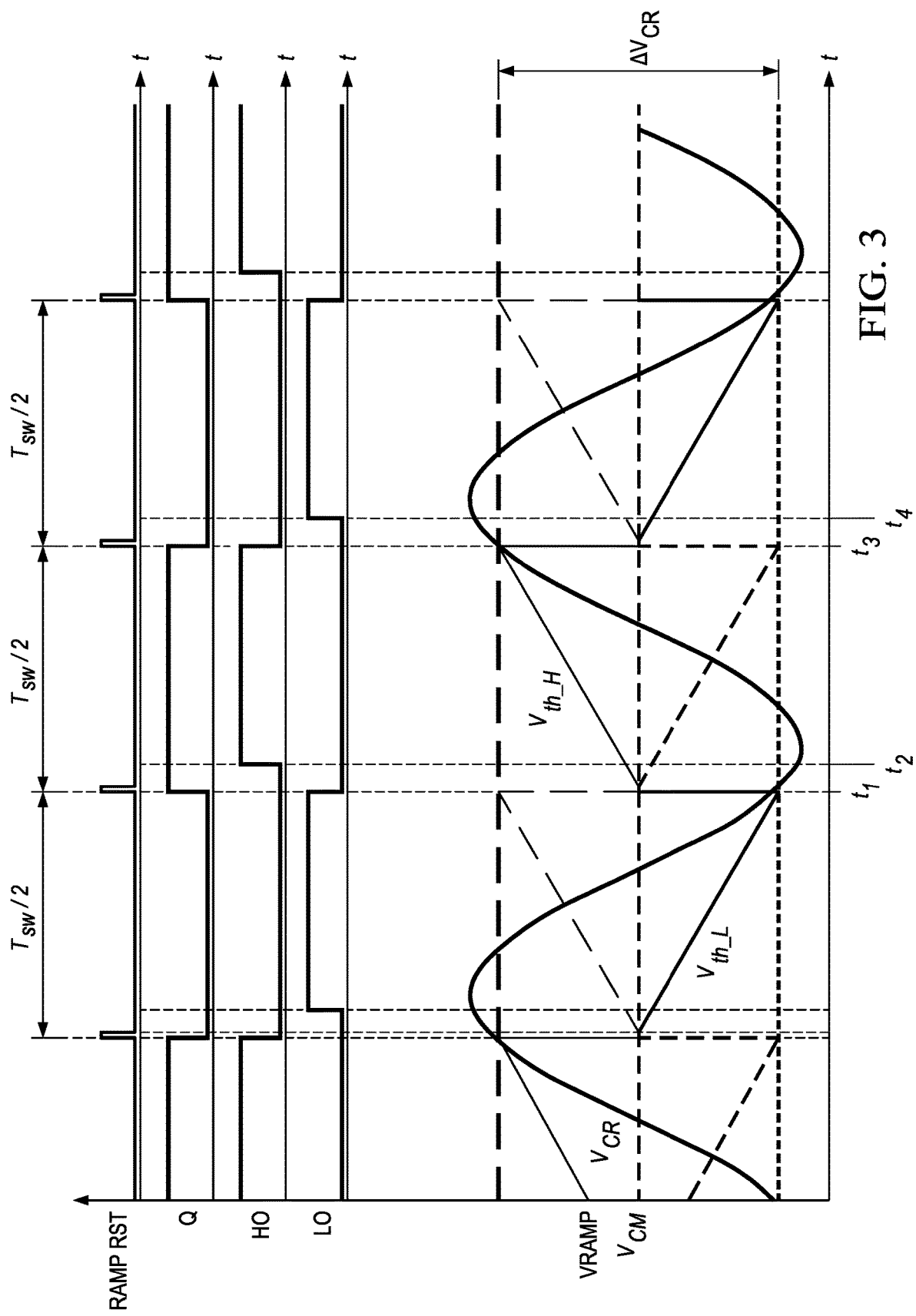
FIG. 3 shows example signals in an LLC resonant converter using average half cycle control.

FIG. 3 shows signals in a resonant converter using average half cycle control. In the threshold ramps of FIG. 3, the absolute value of the slope is proportional to $V_{FB}$, making $\Delta V_{CR}$ equal (or proportional to) $V_{FB}$, and proportional to time.

$$\Delta V_{CR} = \frac{T_{SW}}{2} \cdot \frac{k_c}{C_r} \cdot I_{r_{avg}} + \frac{T_{SW} \cdot S_{RAMP}}{2} \tag{10}$$

The thresholds may be expressed as:

$$V_{th\_H} = k_s \cdot V_{FB} \cdot \frac{T_{SW}}{2} + V_{CM} \tag{11}$$

$$V_{th\_L} = V_{CM} - k_s \cdot V_{FB} \cdot \frac{T_{SW}}{2} \tag{12}$$

In a steady state condition, $V_{FB}$ is constant, at least from one half switching cycle to the next half switching cycle. So, $\Delta V_{CR}$ may be expressed as:

$$\Delta V_{CR} = V_{th\_H} - V_{th\_L} = k_s \cdot V_{FB} \cdot T_{SW} \tag{13}$$

Substituting equation (13) into equation (9):

$$V_{FB} = \frac{1}{2} \cdot \frac{k_c}{k_s \cdot C_r} \cdot I_{r_{avg}} + \frac{S_{RAMP}}{k_s \cdot 2} \tag{14}$$

Thus, except for the terms related to the compensation ramp, which are known and constant, the voltage $V_{FB}$ is proportional to the average of the resonant current.

Figure 4:
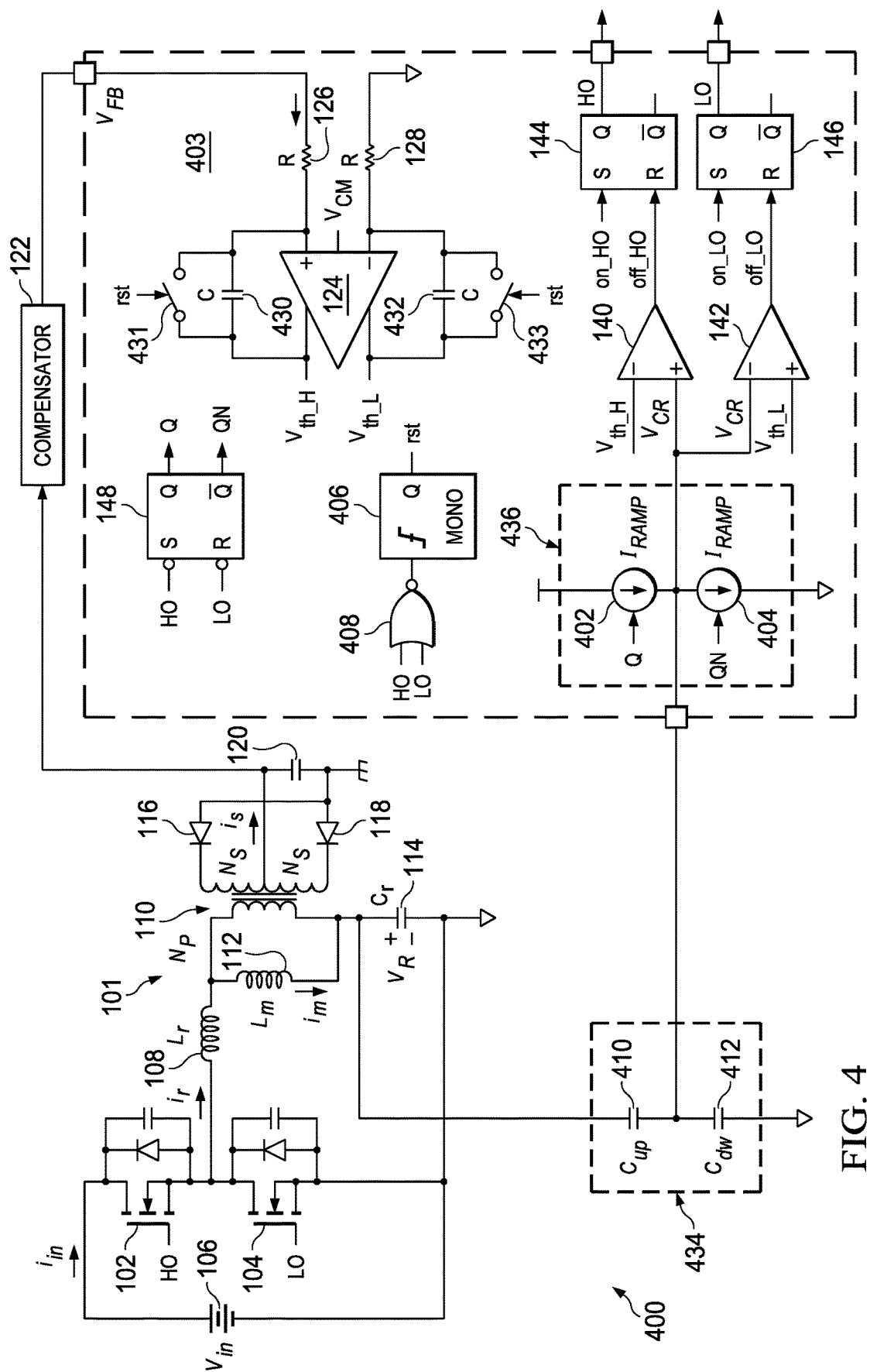
FIG. 4 is a block diagram for an example LLC resonant DC-DC converter that includes average half cycle control.

FIG. 4 is a block diagram for an example resonant DC-DC converter 400 that implements average half cycle control. The resonant DC-DC converter 400 includes the switching circuitry 101 and control circuitry 403. The control circuitry 403 is similar to the control circuitry 103. The scaling and level shifting circuit 434 is an implementation of the scaling and level shifting circuit 134 implemented using a capacitive divider formed by the capacitor 410 and the capacitor 412. The compensation ramp generator 436 is an implementation of the compensation ramp generator 136 that includes a current source 402 that source current to the scaling and level shifting circuit 434 during a first half of the switching cycle (when the high-side switching transistor 102 is on), and a current source 404 that sinks current from the scaling and level shifting circuit 434 during a second half switching cycle (when the high-side switching transistor 102 is off).

The differential amplifier 124 is connected as a differential integrator to generate the threshold ramps $V_{th\_H}$ and $V_{th\_L}$. A capacitor 430 is connected in the feedback path from the output of the differential amplifier 124 to the non-inverting input of the differential amplifier 124, and a capacitor 432 is connected in the feedback path from the output of the differential amplifier 124 to the inverting input of the differential amplifier 124. A switch 431 discharges the capacitor 430, and a switch 433 discharges the capacitor 432, when either of HO or LO transitions from high to low. The monostable multivibrator 406 generates the ramp reset pulse that closes the switch 431 and the switch 433 based on HO and LO. A control terminal of the switch 431 and a control terminal of the switch 433 are coupled to the output of the monostable multivibrator 406 for receipt of the ramp reset pulse. With the control circuitry 403, $V_{FB}$ may be expressed as:

$$V_{FB} = \frac{1}{2} \cdot \frac{k_c}{k_s \cdot C_r} \cdot I_{ravg} + \frac{1}{2} \cdot \frac{k_c}{k_s \cdot C_{up}} \cdot I_{RAMP} \quad (15)$$

where:
$C_{up}$ is the capacitance of the capacitor 410;
$C_{dw}$ is the capacitance of the capacitor 412;
C is the capacitance of the capacitor 430 and the capacitor 432; and
R is the resistance of the resistor 126 and the resistor 128;

$$k_c = \frac{C_{up}}{C_{up} + C_{dw}}; \text{ and} \quad (16)$$

$$k_s = \frac{1}{C \cdot R}. \quad (17)$$

In the resonant DC-DC converter 400, the average resonant current over the half switching cycle in which the high-side switching transistor 102 is on equals the input current (neglecting charge and discharge currents of the parasitic capacitance of the high-side switching transistor 102 and the low-side switching transistor 104). The input current is zero in the other half of the switching cycle, but the absolute value of the resonant current equals (here currents that charge and discharge parasitic capacitance of the transistors are neglected because they are generally much lower than the resonant current) the value of the previous half cycle. So, over an entire switching cycle:

$$I_{in} = \frac{1}{2} \cdot I_{r\_avg}; \text{ and} \quad (18)$$

$$V_{FB} = \frac{k_c}{k_s \cdot C_r} \cdot I_{in} + \frac{1}{2} \cdot \frac{k_c}{k_s \cdot C_{up}} \cdot I_{RAMP}. \quad (19)$$

Figure 5:
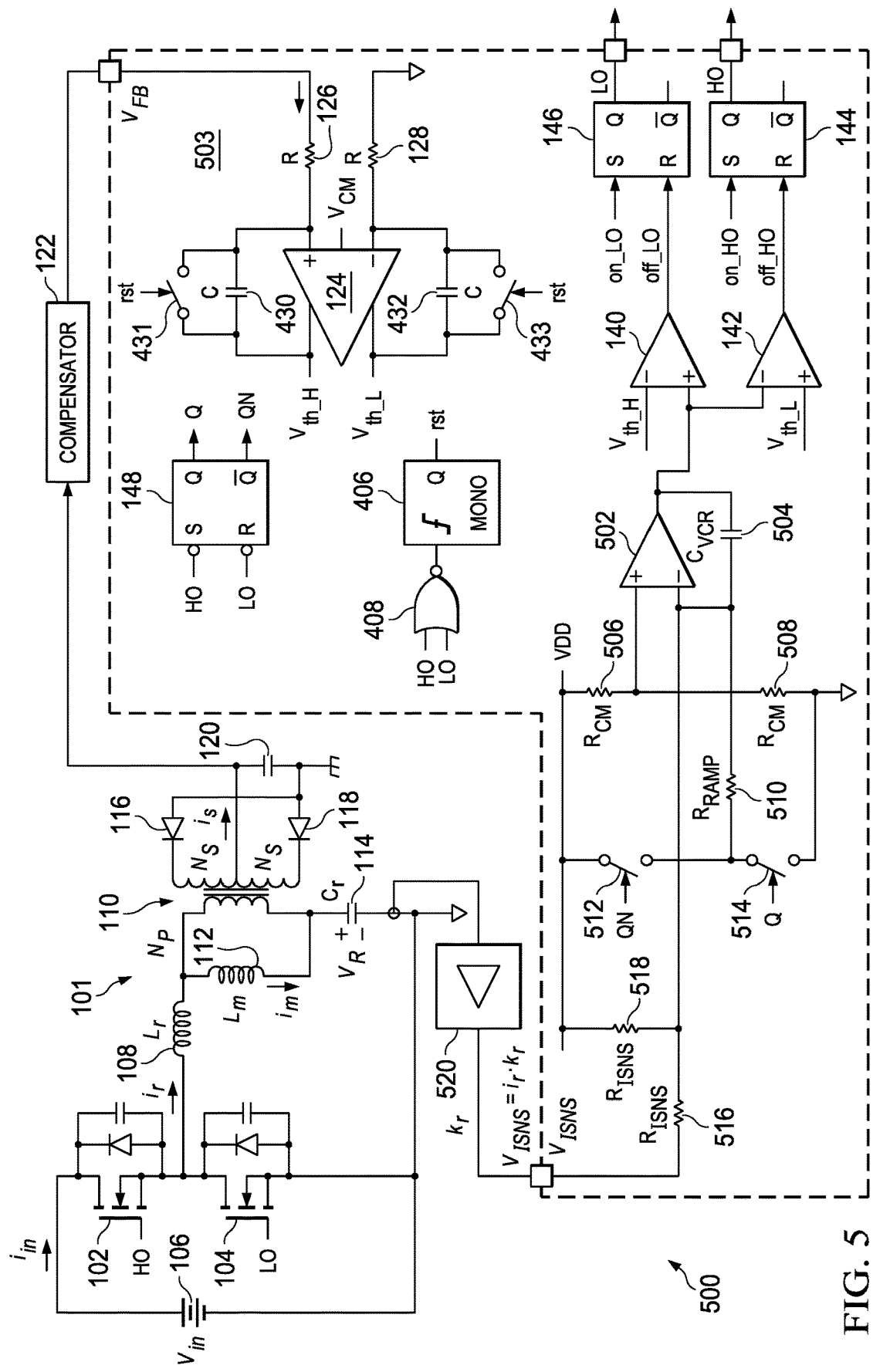
FIG. 5 is a block diagram of another example LLC resonant DC-DC converter that implements average half cycle control.

FIG. 5 is a block diagram of an example resonant DC-DC converter 500 that implements average half cycle control. The resonant DC-DC converter 500 is similar to the resonant DC-DC converter 400, and implements integration of a signal representing resonant current within the control circuitry 503. The resonant DC-DC converter 500 senses resonant current at least to provide overcurrent protection. If the control circuitry 503 is implemented in an integrated circuit (IC), the control circuitry 503 reduced the number of I/O terminals of the IC by integrating the signal representing the resonant current within the control circuitry 503. The control circuitry 503 includes an amplifier 502 that is used to implement an integrator circuit, and ramps compensation. The ramps allow the control circuitry 503 to provide a 50% duty cycle. In the resonant DC-DC converter 400, the ramps are generated using the current sources 402 and 404. To provide a 50% duty cycle in the resonant DC-DC converter 400, the currents provided by the current source 402 and the current source 404 must be equal, so mismatch in the current source 402 and the current source 404 must be minimized. The control circuitry 503 includes ramp generation circuitry that generates compensating ramps by switching a resistor 510 between ground and $V_{DD}$. The resistor 510 is coupled to the inverting input of the amplifier 502, and the inverting input of the amplifier 502 is coupled to the output of the amplifier 502 via a capacitor 504. The switches 512 and 514 are coupled to the resistor 510 to switch the resistor 510 between a power terminal ($V_{DD}$) and ground.

The resistors 506 and 508 form a voltage divider coupled to the non-inverting input of the amplifier 502. The resistances of the resistor 506 and the resistor 508 should also be equal. A resistor 516 is coupled between the resonant current sensor 520 and the inverting input of the amplifier 502, and a resistor 518 is coupled between $V_{DD}$ and the inverting input of the amplifier 502. The resistance of the resistor 518 and the resistor 516 should be equal. In the resonant DC-DC converter 500:

$$V_{FB} = \frac{k_r}{k_s \cdot R_{ISNS} \cdot C_{VCR}} \cdot I_{in} + \frac{1}{4} \cdot \frac{VDD}{k_s \cdot R_{RAMP} \cdot C_{VCR}} \quad (20)$$

where:
$k_r$ is the gain of the resonant current sensor 520;
$k_s$ is the constant for the slope of the ramps used for $V_{th\_H}$ and $V_{th\_L}$ thresholds given $V_{FB}$.
$R_{ISNS}$ is the resistance of the resistor 516 and the resistor 518;
$C_{VCR}$ is the capacitance of the capacitor 504;
$I_{in}$ is the current flowing into the resonant current sensor 520; and
$R_{RAMP}$ is the resistance of the resistor 510.

In the control circuitry 503, $V_{CR}$ is inverted by the amplifier 502. To account for the inversion, the low-side switching transistor 104 is turned off when $V_{CR}$ exceeds $V_{th\_H}$, and the high-side switching transistor 102 is turned off when $V_{CR}$ falls below $V_{th\_L}$.

Figure 6:
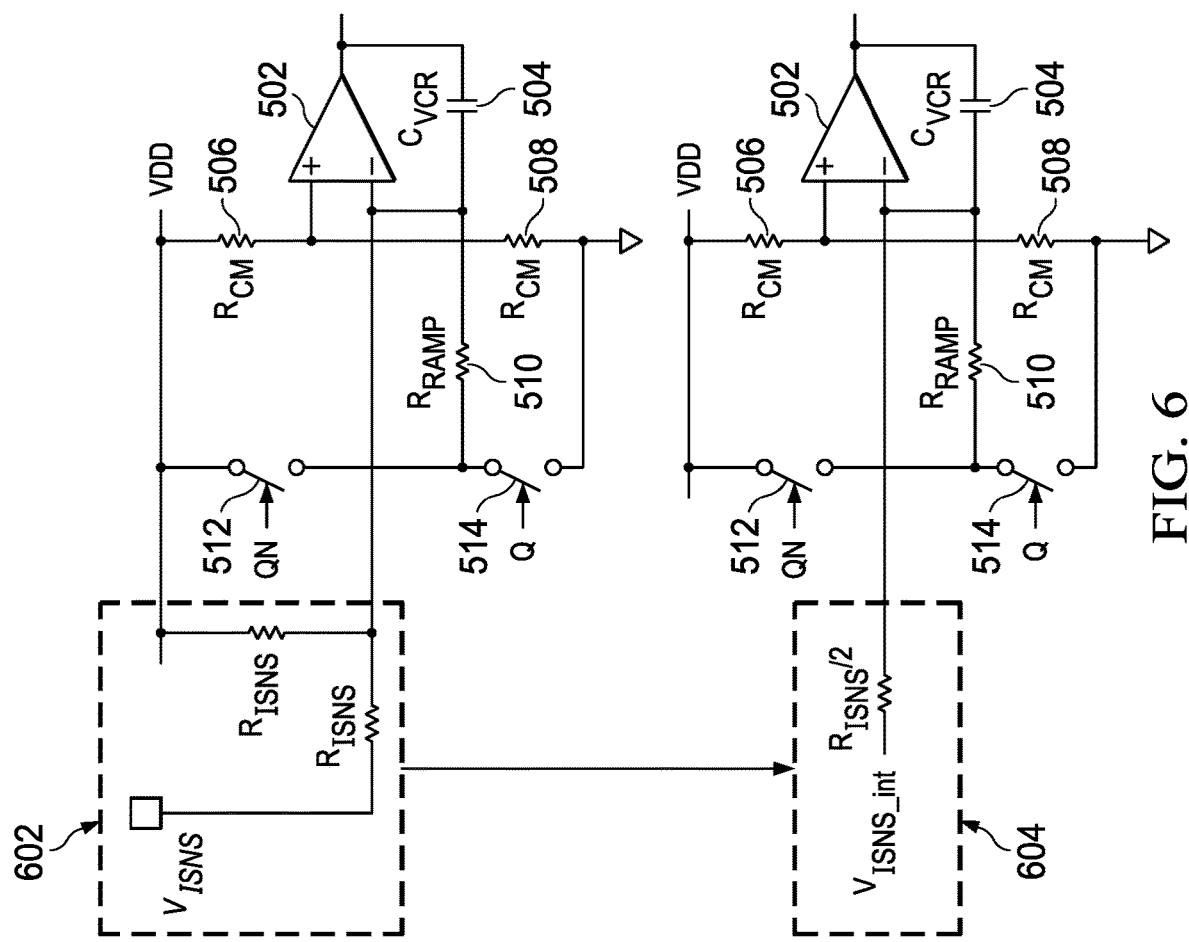
FIG. 6 shows the Thevenin equivalent circuit of an input resistor network of the LLC resonant DC-DC converter of FIG. 5.

The signal $V_{ISNS}$ generated by the resonant current sensor 520 can be positive or negative. In a steady state condition, the resonant current Ir detected by the resonant current sensor 520 is symmetrical with respect to zero, and will be positive and negative. The sense signal $V_{ISNS}$ will also be positive and negative with respect to zero volts. The two $R_{ISNS}$ resistors 516 and 518 translate and reduce $V_{ISNS}$ to a positive voltage for input to the amplifier 502, where $V_{DD} > V_{ISNS} > -V_{DD}$. FIG. 6 shows the Thevenin equivalent circuit 604 of the resistor network 602, where:

$$V_{ISNS\_int} = \frac{V_{ISNS}}{2} + \frac{VDD}{2}. \quad (21)$$

Referring to equation (20), except for a constant term, the control signal ($V_{FB}$) is proportional to the converter input current. It may be more desirable to have $V_{FB}$ proportional to converter output power or converter input power. The term $I_{in}$ in equation (20) can be multiplied and divided by $V_{in}$ to convert to power.

$$V_{FB} = \frac{k_r}{k_s \cdot R_{ISNS} \cdot C_{VCR}} \cdot \frac{V_{in} \cdot I_{in}}{V_{in}} + \frac{1}{4} \cdot \frac{VDD}{k_s \cdot R_{RAMP} \cdot C_{VCR}} \quad (22)$$

-continued $$V_{FB} = \frac{k_r}{k_s \cdot (R_{ISNS} \cdot V_{in}) \cdot C_{VCR}} \cdot P_{in} + \frac{1}{4} \cdot \frac{VDD}{k_s \cdot R_{RAMP} \cdot C_{VCR}} \quad (23)$$

Figure 7:
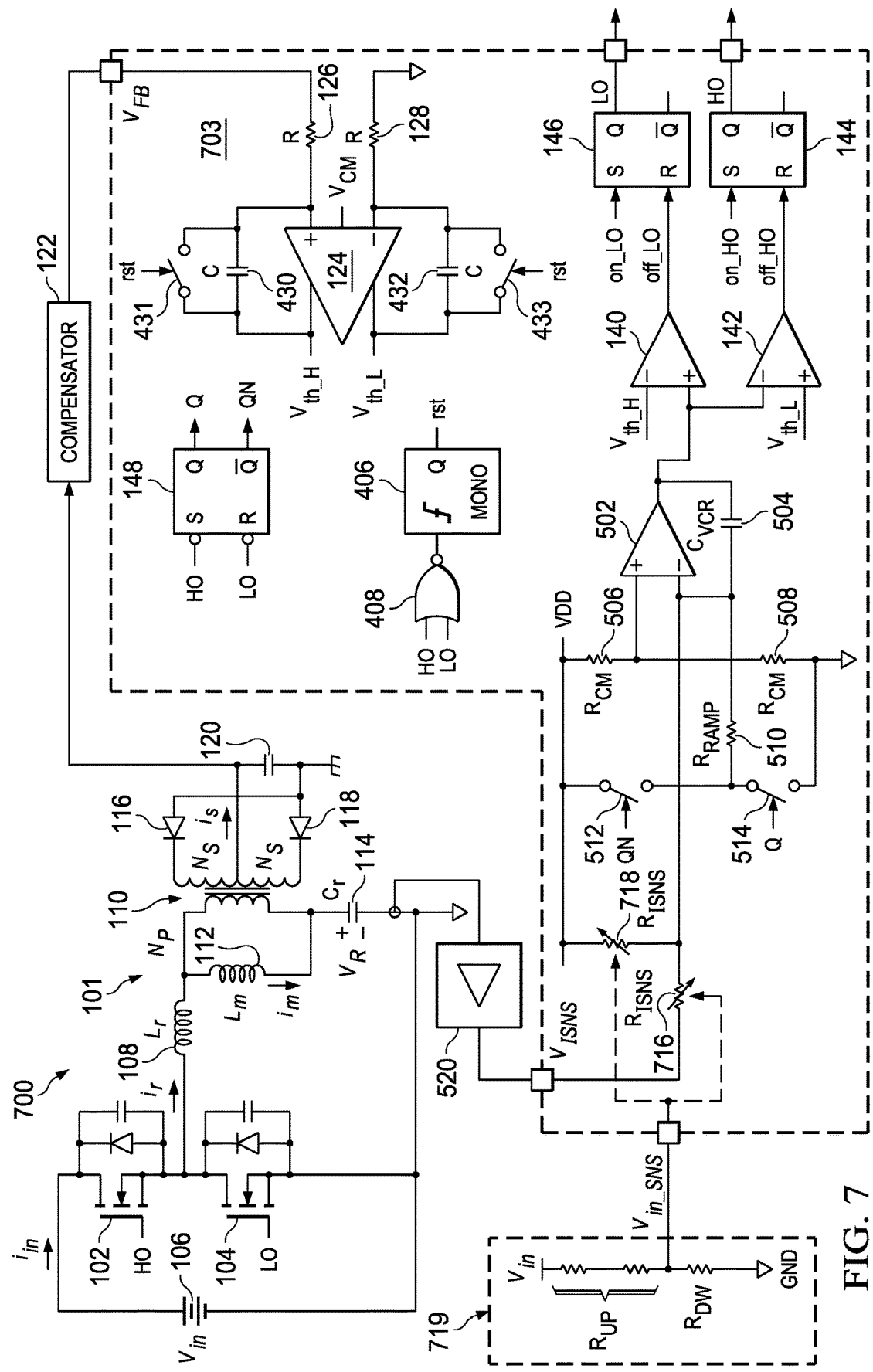
FIG. 7 is a block diagram of an example LLC resonant DC-DC converter that implements average half cycle control and varies input resistance based on input voltage.

Because the input voltage changes very slowly with respect to the switching period of the resonant DC-DC converter, the value of $R_{ISNS}$ (resistors 516 and 518) can be changed cycle by cycle to be inversely proportional to $V_{in}$, and thereby compensate for variation in $V_{in}$. FIG. 7 is a block diagram of an example resonant DC-DC converter 700 that implements average half cycle control and varies the value of $R_{ISNS}$ based on $V_{in}$. The resonant DC-DC converter 700 is similar to the resonant DC-DC converter 500. In the resonant DC-DC converter 700, the variable resistors 716 and 718 replace the resistors 516 and 518 of the resonant DC-DC converter 500. A sensing circuit 719 senses $V_{in}$, and provides a control signal $V_{in\_SNS}$ that controls the resistance of the resistors 716 and 718. In the resonant DC-DC converter 700:

$$R_{ISNS} \cdot V_{in} = \text{Constant} \quad (24)$$

Figure 8A:
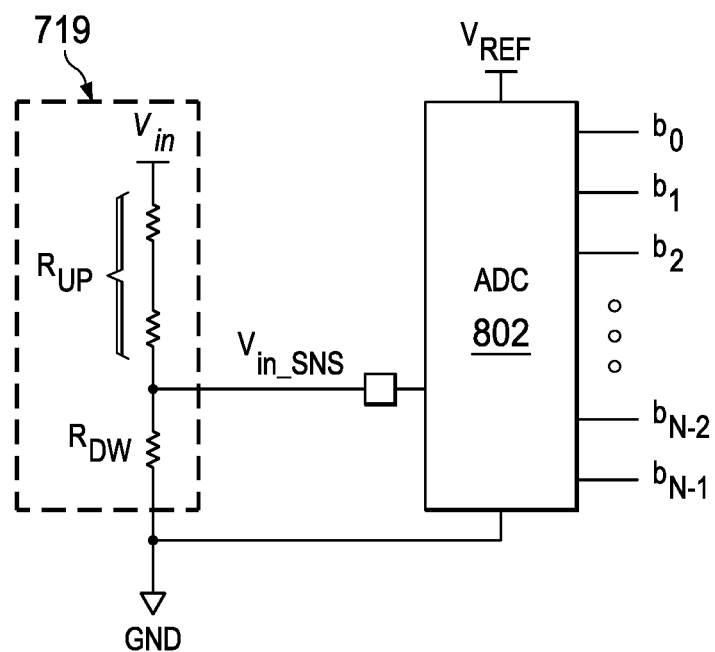
FIG. 8A shows an example circuit for sensing input voltage and controlling input resistance in the LLC resonant DC-DC converter of FIG. 7.

In some implementations of equation (24), the sensing circuit 719 senses $V_{in}$, converts $V_{in}$ to a digital value, and uses the digital value of $V_{in}$ to change the resistance of the resistors 716 and 718. FIG. 8A shows an example circuit for sensing $V_{in}$ and providing a control value for varying $R_{ISNS}$ in the control circuitry 703. The sensing circuit 719 includes a resistor divider that senses $V_{in}$. The control circuitry 703 includes an analog-to-digital converter (ADC) 802 that converts $V_{in\_SNS}$ to a digital value (b0-$b_{N-1}$). Various implementations of the ADC 802 may provide different numbers of bits in the digital output value.

Figure 8B:
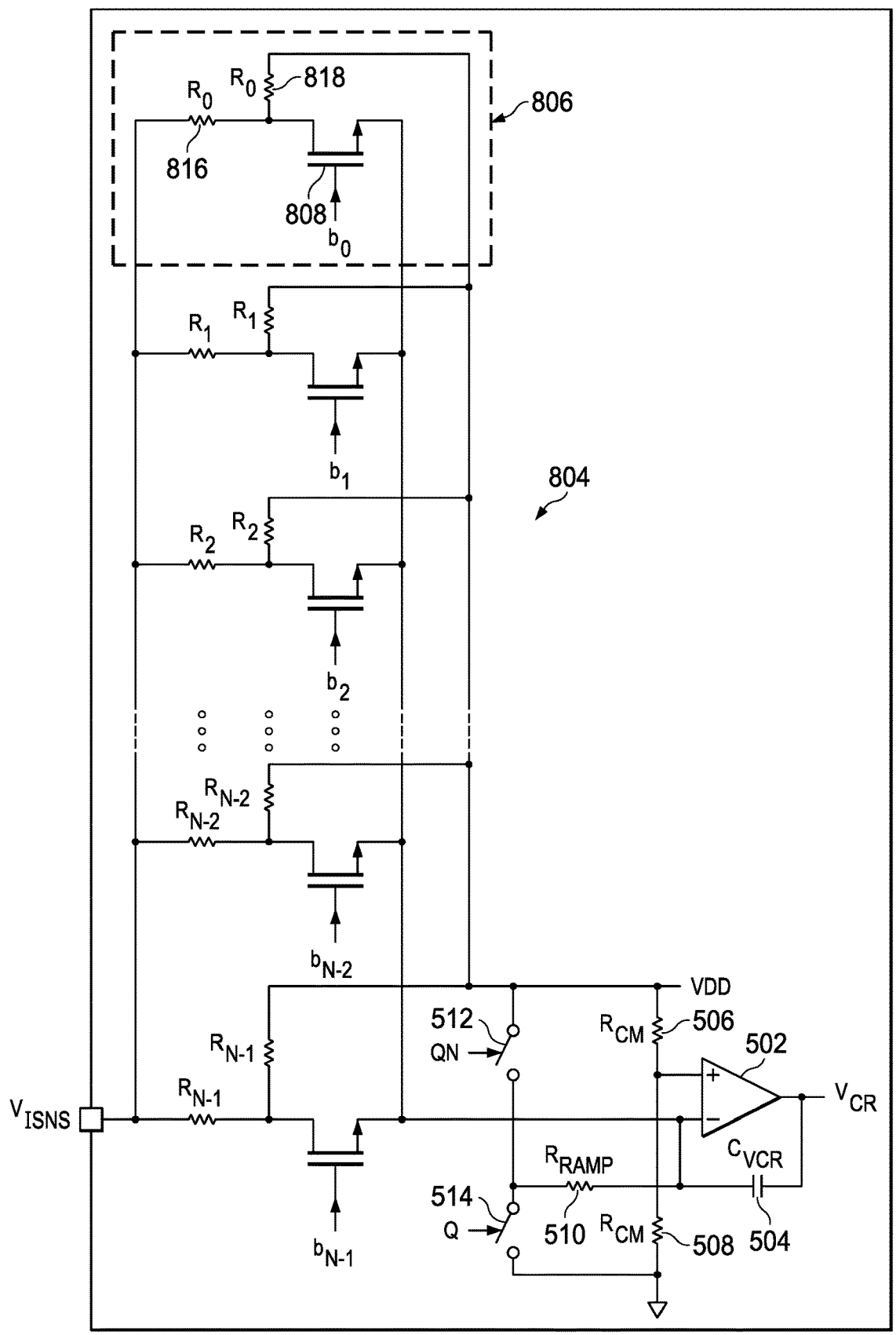
FIG. 8B shows an example resistor switching circuit for varying input resistance in the LLC resonant DC-DC converter of FIG. 7.

FIG. 8B shows a portion of the control circuitry 703 including a resistor switching circuit 804 for varying $R_{ISNS}$ based on the output of the ADC 802. The resistor switching circuit 804 is an implementation of the variable resistor 716 and the variable resistor 718 and is coupled to the inverting input of the amplifier 502. The resistor switching circuit 804 includes multiple switching cells 806 connected in parallel, where each switching cell 806 is controlled by a different bit of the digital value generated by the ADC 802. The switching cell 806 includes a transistor 808, a resistor 816, and a resistor 818. The transistor 808 operates as a switch to connect the resistor 816 and the resistor 818 to the inverting input of the amplifier 502 based on the value of the bit of the digital value provided by the ADC 802 that controls the transistor 808. Thus, the number of resistors 816 and 818 connected in parallel increases (decreasing $R_{ISNS}$) as $V_{in}$ increases.

$$V_{in} = \frac{V_{REF}}{k_i \cdot (2^N - 1)} \cdot \left(b_0 + b_1 \cdot 2 + b_2 \cdot 2^2 + \cdots + b_{N-1} \cdot 2^{N-1}\right) \quad (25)$$

$$R_{ISNS} = \frac{R_0}{\left(b_0 + b_1 \cdot 2 + b_2 \cdot 2^2 + \cdots + b_{N-1} \cdot 2^{N-1}\right)} \quad (26)$$

$$R_{ISNS} = R_0 \cdot \frac{V_{REF}}{V_{in} \cdot k_i \cdot (2^N - 1)} \quad (27)$$

$$R_{ISNS} \cdot V_{in} = R_0 \cdot \frac{V_{REF}}{k_i \cdot (2^N - 1)} \quad (28)$$

where:

$R_0$ is the resistance of the resistors 816 and 818;
N is the number of bits used to codify $V_{in}$ in the ADC 802;
$V_{ref}$ is the reference voltage applied by the ADC 802 to digitize $V_{in}$; and
$k_i$ is the gain of the sensor used to sense $V_{in}$ (e.g., the resistor divider of the sensing circuit 719).

Combining equations (23) and (27) yields:

$$V_{FB} = \frac{k_r \cdot k_i \cdot (2^N - 1)}{k_s \cdot R_0 \cdot V_{REF} \cdot C_{VCR}} \cdot P_{in} + \frac{1}{4} \cdot \frac{VDD}{k_s \cdot R_{RAMP} \cdot C_{VCR}} \quad (29)$$

where, except for the constant term $$\frac{1}{4} \cdot \frac{VDD}{k_s \cdot R_{RAMP} \cdot C_{VCR}}$$

the control voltage $V_{FB}$ is proportional to the input power because the term $$\frac{1}{4} \cdot \frac{k_r \cdot k_i \cdot (2^N - 1)}{k_s \cdot R_0 \cdot V_{REF} \cdot C_{VCR}}$$

that multiplies the input power is also constant with load.

Figure 9:
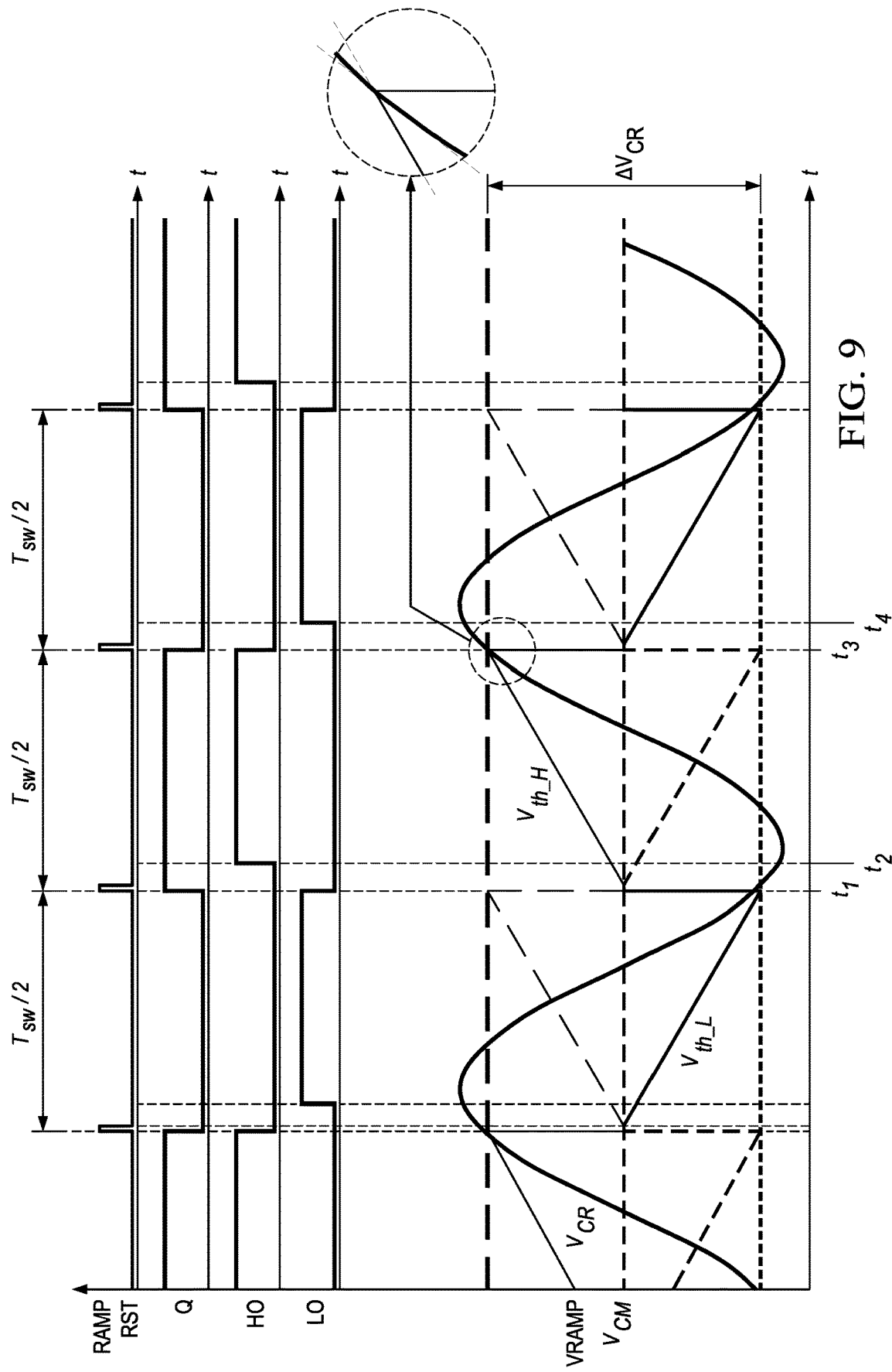
FIG. 9 shows an example intercept of a threshold ramp and a resonant voltage in an LLC resonant converter that implements average half cycle control.

FIG. 9 replicates FIG. 3 to show a magnified intercept of $V_{CR}$ and $V_{th\_H}$. The slopes of $V_{CR}$ and $V_{th\_H}$ at the point of intercept may be similar. Likewise, the slopes of $V_{CR}$ and $V_{th\_L}$ at the point of intercept may be similar. The similar slopes may cause an error in detection of the intercept point, which may result in the on time of the high-side switching transistor 102 or the low-side switching transistor 104 being shorter or longer than is expected. To reduce this uncertainty, some resonant DC-DC converters that implement average half cycle control may and apply constant or nearly constant threshold voltages.

Figure 10:
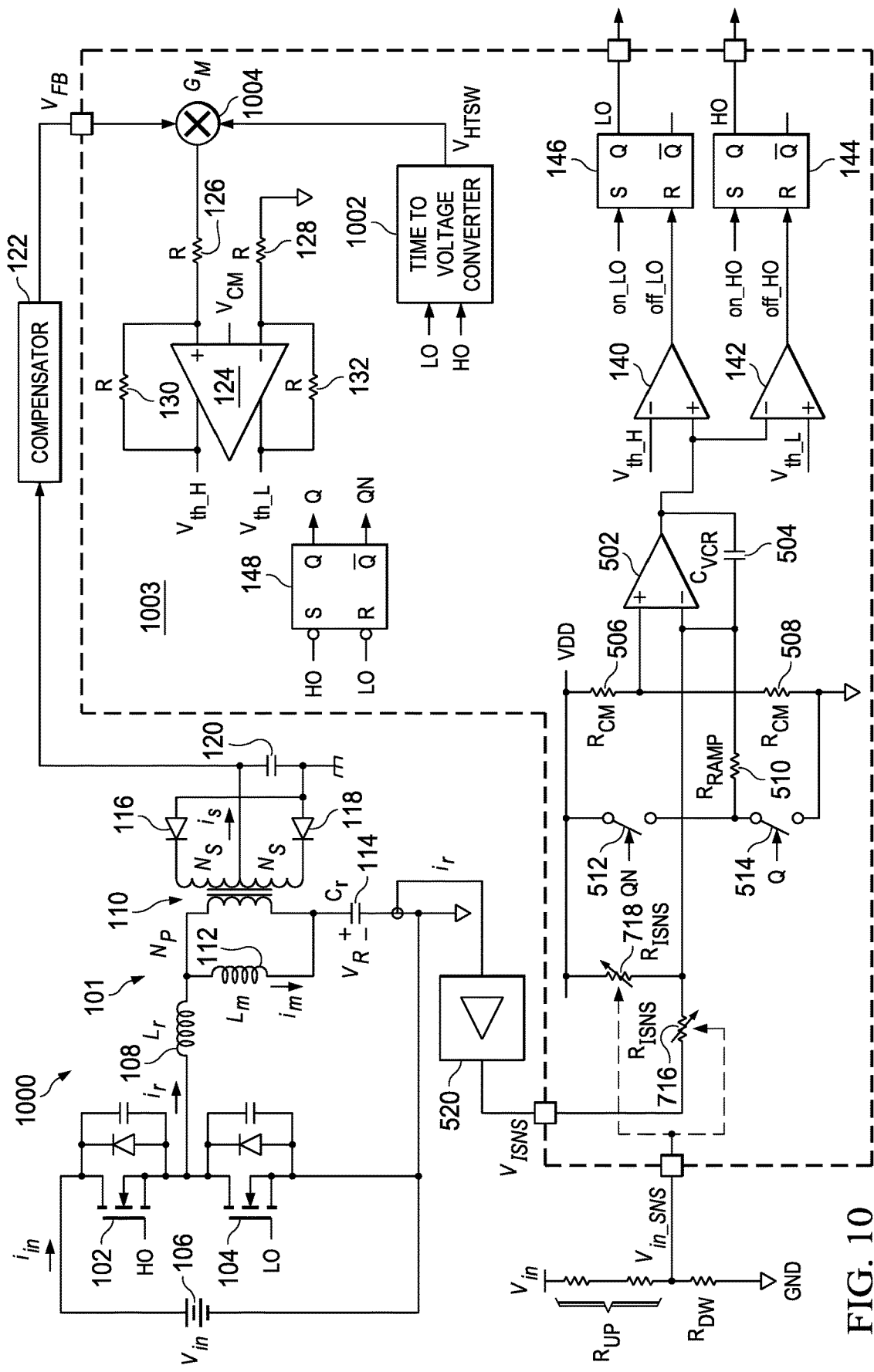
FIG. 10 is a block diagram of an example LLC resonant DC-DC converter that implements average half cycle control and applies constant or nearly constant threshold voltages.

FIG. 10 is a block diagram of an example resonant DC-DC converter 1000 that implements average half cycle control and applies constant or nearly constant threshold voltages. The resonant DC-DC converter 1000 is similar to the resonant DC-DC converter 700, but instead of generating a ramp signal with a slope that is proportional to $V_{FB}$, the resonant DC-DC converter 1000 generates a signal that is proportional to the duration of the previous half switching period, and multiplies the signal with $V_{FB}$. The control circuitry 1003 is similar to the control circuitry 703. In the control circuitry 1003, the differential amplifier 124 is not configured as a differential integrator. The control circuitry 1003 includes a time-to-voltage converter 1002 and a multiplier 1004. The multiplier 1004 multiples VFB by the output signal ($V_{HTSW}$) of the multiplier 1004. The multiplier 1004 includes inputs coupled to the output of the compensator circuit 122 and the output of the time-to-voltage converter 1002. An output of the multiplier 1004 is coupled to the non-inverting input of the differential amplifier 124 via the resistor 126.

The time-to-voltage converter 1002 converts the time that HO or LO is active (high) to a voltage. The time-to-voltage converter 1002 includes an input coupled to the flip-flop 144, and an input coupled to the flip-flop 146. In the control circuitry 1003:

$$V_{th\_H} = V_{CM} + \frac{1}{2} \cdot G_M \cdot V_{HTSW} \cdot V_{FB} \quad (30)$$

-continued
$$V_{th\_L} = V_{CM} - \frac{1}{2} \cdot G_M \cdot V_{HTSW} \cdot V_{FB} \quad (31)$$

where:
$G_M$ is the gain of the multiplier 1004; and
$V_{HTSW}$ is the output signal of the time-to-voltage converter 1002.

Figure 11:
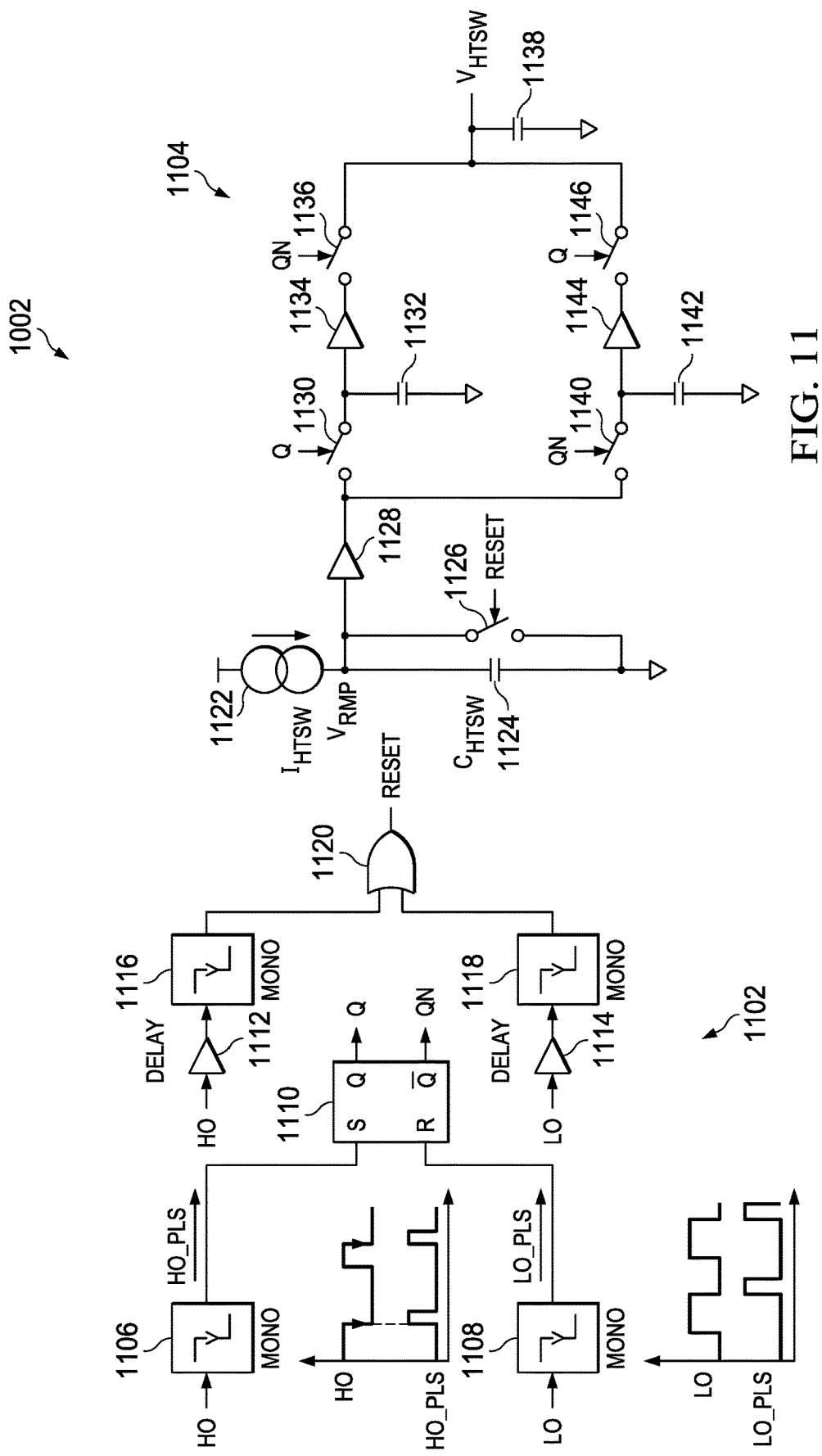
FIG. 11 is a schematic level diagram for an example time-to-voltage converter suitable for use in the LLC resonant DC-DC converter of FIG. 10.

FIG. 11 is a schematic level diagram for an example of the time-to-voltage converter 1002. The time-to-voltage converter 1002 includes control circuitry 1102 and time-voltage circuitry 1104. The control circuitry 1102 includes a monostable multivibrator 1106, a monostable multivibrator 1108, a monostable multivibrator 1116, monostable multivibrator 1118, a flip-flop 1110, a delay circuit 1112, a delay circuit 1114, and a logic gate 1120.

The monostable multivibrator 1106 generates a pulse at each falling edge of HO. The monostable multivibrator 1108 generates a pulse at each falling edge of LO. An input of the monostable multivibrator 1106 is coupled to the output of the flip-flop 144 (FIG. 5). An input of the monostable multivibrator 1108 is coupled to the output of the flip-flop 146 (FIG. 5). The output of the monostable multivibrator 1106 is coupled to an input (set) of the flip-flop 1110, and the output of the monostable multivibrator 1108 is coupled to an input (reset) of the flip-flop 1110.

The monostable multivibrator 1116 generates a pulse at each delayed falling edge of HO, and the monostable multivibrator 1118 generates a pulse at each delayed falling edge of the LO. The logic gate 1120 combines the pulses generated by the monostable multivibrator 1116 and the monostable multivibrator 1118 to produce reset pulses for use by the time-voltage circuitry 1104. An input of the delay circuit 1112 is coupled to the output of the flip-flop 144 (FIG. 5), and an output of the delay circuit 1112 is coupled to an input of the monostable multivibrator 1116. An input of the delay circuit 1114 is coupled to the output of the flip-flop 146 (FIG. 5), and an output of the delay circuit 1114 is coupled to an input of the monostable multivibrator 1118. The output of the monostable multivibrator 1116 and the output of the monostable multivibrator 1118 are coupled to inputs of the logic gate 1120.

The time-voltage circuitry 1104 includes a current source 1122, a capacitor 1124, a switch 1126, a buffer 1128, a switch 1130, a capacitor 1132, a buffer 1134, a switch 1136, a capacitor 1138, a switch 1140, a capacitor 1142, a buffer 1144, and a switch 1146. The current source 1122 charges the capacitor 1124 to generate a voltage ramp ($V_{RMP}$). The switch 1126 is closed by the reset pulses received from the logic gate 1120 to discharge the capacitor 1124 and restart the ramp. The buffer 1128 buffers the voltage across the capacitor 1124 to charge the capacitor 1132 and the capacitor 1142.

When the flip-flop 1110 is set (the Q signal provided by the flip-flop 1110 is high and the QN signal provided by the flip-flop 1110 is low), the switch 1130 is closed, the capacitor 1132 is charged to the voltage across the capacitor 1124, and the switch 1136 is open to isolate the capacitor 1138 from the capacitor 1132. When the flip-flop 1110 is reset (the Q signal provided by the flip-flop 1110 is low and the QN signal provided by the flip-flop 1110 is high), the switch 1130 is open to isolate the capacitor 1132 from the capacitor 1124, and the switch 1136 is closed to charge the capacitor 1138 from the capacitor 1132.

When the flip-flop 1110 is reset (the Q signal provided by the flip-flop 1110 is low and the QN signal provided by the flip-flop 1110 is high), the switch 1140 is closed, the capacitor 1142 is charged to the voltage across the capacitor 1124, and the switch 1146 is open to isolate the capacitor 1138 from the capacitor 1142. When the flip-flop 1110 is set (the Q signal provided by the flip-flop 1110 is high and the QN signal provided by the flip-flop 1110 is low), the switch 1140 is open to isolate the capacitor 1142 from the capacitor 1124, and the switch 1146 is closed to charge the capacitor 1138 from the capacitor 1142.

Figure 12:
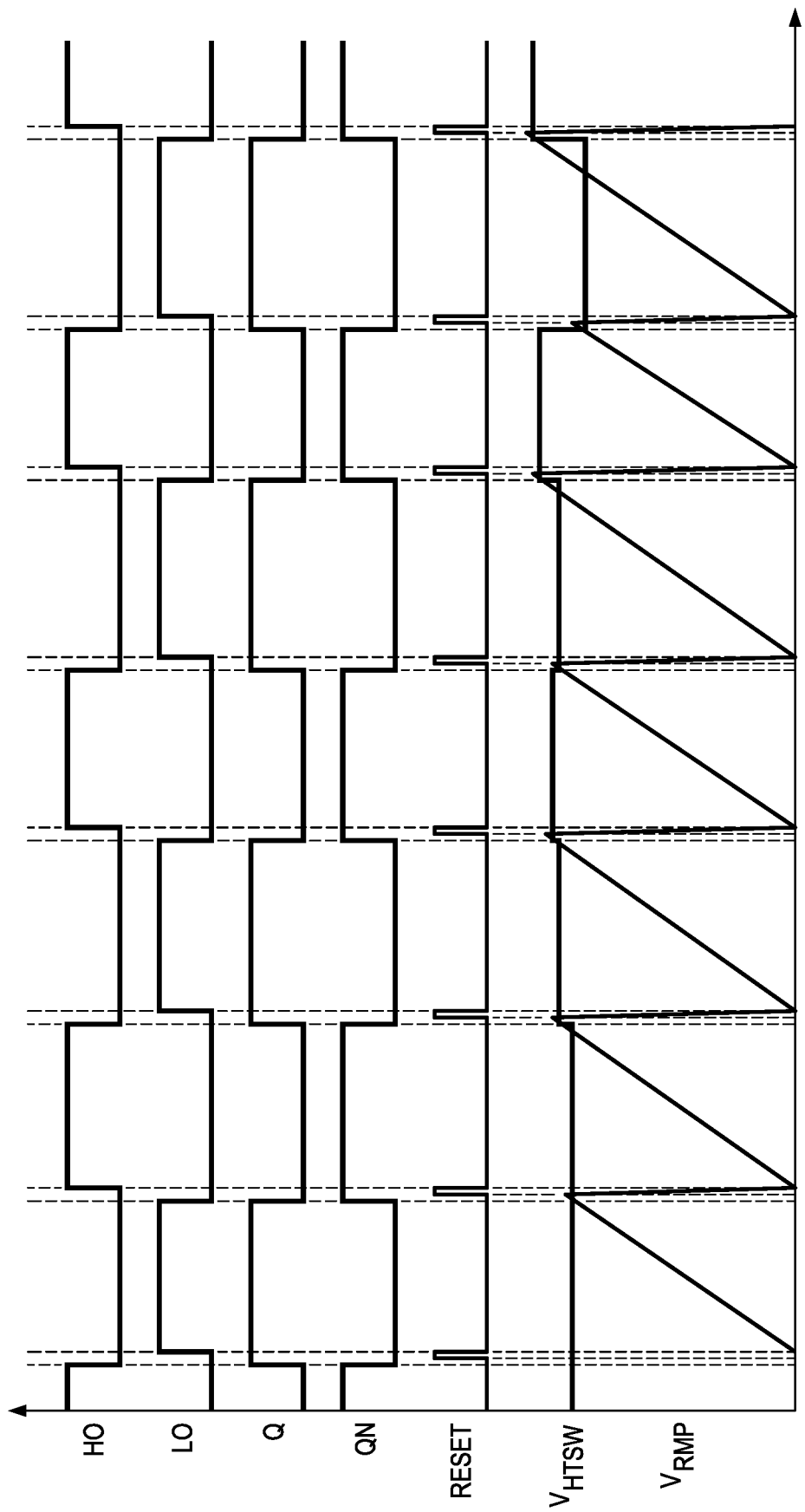
FIG. 12 shows example signals generated in the time-to-voltage converter of FIG. 11.

FIG. 12 illustrates examples of the signals generated in the time-to-voltage converter 1002. FIG. 12 shows the signals Q and QN generated by the flip-flop 1110, the signal RESET generated by the logic gate 1120, the voltage $V_{RMP}$ across the capacitor 1124, and the output voltage $V_{HTSW}$ of the time-to-voltage converter 1002. $V_{RMP}$ is reset by each RESET pulse, and the current source 1122 charges the capacitor 1124 while the RESET pulse is low to generate $V_{RMP}$. The capacitor 1132 and the capacitor 1142 alternately track $V_{RMP}$ while the other holds the value of $V_{RMP}$ captured in the previous half-cycle for output as $V_{HTSW}$.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

Modifications are possible in the described embodiments, and other embodiments are possible, within the scope of the claims.

What is claimed is:

1. A resonant DC-DC converter control circuitry, comprising:
   a feedback input;
   a differential integrator including:
      a first input coupled to the feedback input;
      a second input coupled to a ground terminal;
      a first output; and
      a second output;
   a resonant voltage input;
   a first comparator including:
      an output;
      a first input coupled to the resonant voltage input; and
      a second input coupled to the first output of the differential integrator;
   a second comparator including:
      an output;
      a first input coupled to the resonant voltage input; and
      a second input coupled to the second output of the differential integrator;
   a first flip-flop including an input coupled to the output of the first comparator, and an output;
   a second flip-flop including an input coupled to the output of the second comparator, and an output; and
   a monostable multivibrator including an input coupled to the output of the first flip-flop and the output of the second flip-flop.

2. The resonant DC-DC converter control circuitry of claim 1, wherein:
   the monostable multivibrator includes an output; and
   the differential integrator includes:
      a first switch coupled between the first input of the differential integrator and the first output of the differential integrator, the first switch having a control terminal coupled to the output of the monostable multivibrator; and
      a second switch coupled between the second input of the differential integrator and the second output of the differential integrator, the second switch having a control terminal coupled to the output of the monostable multivibrator.

3. The resonant DC-DC converter control circuitry of claim 1, wherein the differential integrator includes:
   a first capacitor coupled between the first input of the differential integrator and the first output of the differential integrator; and
   a second capacitor coupled between the second input of the differential integrator and the second output of the differential integrator.

4. The resonant DC-DC converter control circuitry of claim 1, further comprising:
   an integrator circuit including:
      an input coupled to the resonant voltage input; and
      an output coupled to the first input of the first comparator and the first input of the second comparator;
   a resistor coupled to the input of the integrator circuit;
   a first switch coupled between the resistor and a power terminal; and
   a second switch coupled between the resistor and a ground terminal.

5. The resonant DC-DC converter control circuitry of claim 4, wherein:
   the resistor is a first resistor; and
   the resonant DC-DC converter control circuitry includes:
      a second resistor coupled between the resonant voltage input and the input of the integrator circuit; and
      a third resistor coupled between the power terminal and the input of the integrator circuit.

6. The resonant DC-DC converter control circuitry of claim 5, wherein:
   the second resistor and the third resistor are variable resistors; and
   resonant DC-DC converter control circuitry includes:
      an analog-to-digital converter including:
         an input coupled to the resonant voltage input; and
         an output coupled to the second resistor and the third resistor.

7. A resonant DC-DC converter control circuitry, comprising:
   a differential integrator configured to:
      generate a first threshold ramp based on a feedback signal received from an output of a resonant DC-DC converter;
      generate a second threshold ramp based on the feedback signal;
   a first comparator coupled to the differential integrator, and configured to compare the first threshold ramp to a resonant voltage generated in the resonant DC-DC converter;
   a second comparator coupled to the differential integrator, and configured to compare the second threshold ramp to the resonant voltage;
   a first flip-flop coupled to the first comparator, and configured to generate a first power transistor control signal based on an output signal of the first comparator;
   a second flip-flop coupled to the second comparator, and configured to generate a second power transistor control signal based on an output signal of the second comparator; and
   a monostable multivibrator coupled to the first flip-flop and the second flip-flop, and configured to generate a pulse responsive to the first power transistor control signal or the second power transistor control signal.

8. The resonant DC-DC converter control circuitry of claim 7, wherein the differential integrator is configured to reset the first threshold ramp and the second threshold ramp responsive to a pulse generated by the monostable multivibrator.

9. The resonant DC-DC converter control circuitry of claim 7, further comprising:
an integrator circuit coupled to the first comparator and the second comparator, and configured to integrate the resonant voltage.

10. The resonant DC-DC converter control circuitry of claim 9, further comprising:
a ramp generation circuit coupled to the integrator circuit, and configured to switch source and sink current through a resistor to the integrator circuit.

11. The resonant DC-DC converter control circuitry of claim 9, further comprising a resistor network coupled to the integrator circuit, and configured to scale the resonant voltage for input to the integrator circuit.

12. The resonant DC-DC converter control circuitry of claim 11, wherein:
a resistance of the resistor network is variable; and
the resonant DC-DC converter control circuitry includes an analog-to-digital converter coupled to the resistor network, and configured to set the resistance of the resistor network based on an input voltage switched by the resonant DC-DC converter.

13. A resonant DC-DC converter control circuitry, comprising:
a first flip-flop configured to generate a first power transistor control signal; and
a second flip-flop configured to generate a second power transistor control signal;
a time-to-voltage converter coupled to the first flip-flop and the second flip-flop, and configured to generate a time voltage proportional to a half cycle of the first power transistor control signal or the second power transistor control signal;
a multiplier coupled to the time-to-voltage converter, and configured to multiply the time voltage with a feedback signal received from an output of a resonant DC-DC converter; and
a differential amplifier coupled to the multiplier, and configured to generate a first threshold voltage and a second threshold voltage based on an output signal of the multiplier.

14. The resonant DC-DC converter control circuitry of claim 13, further comprising:
a first comparator coupled to the differential amplifier and the first flip-flop, and configured to compare the first threshold voltage to a resonant voltage generated in the resonant DC-DC converter; and
a second comparator coupled to the differential amplifier and the second flip-flop, and configured to compare the second threshold voltage to the resonant voltage.

15. The resonant DC-DC converter control circuitry of claim 14, further comprising:
an integrator circuit coupled to the first comparator and the second comparator, and configured to integrate the resonant voltage.

16. The resonant DC-DC converter control circuitry of claim 15, further comprising:
a ramp generation circuit coupled to the integrator circuit, and configured to switch source and sink current through a resistor to the integrator circuit.

17. The resonant DC-DC converter control circuitry of claim 15, further comprising:
a resistor network coupled to the integrator circuit, and configured to scale the resonant voltage for input to the integrator circuit.

18. The resonant DC-DC converter control circuitry of claim 17, wherein:
a resistance of the resistor network is variable; and
the resonant DC-DC converter control circuitry includes an analog-to-digital converter coupled to the resistor network, and configured to set the resistance of the resistor network based on an input voltage switched by the resonant DC-DC converter.

* * * * *